(12) United States Patent
Kim (10) Patent No.: US 9,650,034 B2
(45) Date of Patent: May 16, 2017

(54) APPARATUS AND METHOD FOR CONTROLLING HYBRID VEHICLE

(71) Applicant: HYUNDAI MOTOR COMPANY, Seoul (KR)

(72) Inventor: MinSu Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/946,303

(22) Filed: Nov. 19, 2015

(65) Prior Publication Data

US 2017/0057487 A1 Mar. 2, 2017

(30) Foreign Application Priority Data

Aug. 31, 2015 (KR) ........................ 10-2015-0122953

(51) Int. Cl.
*B60W 10/06* (2006.01)
*F01N 3/18* (2006.01)
(Continued)

(52) U.S. Cl.
CPC ............ *B60W 20/14* (2016.01); *B60W 10/06* (2013.01); *B60W 10/08* (2013.01); *B60W 10/30* (2013.01); *F01N 3/18* (2013.01); *B60W 2510/244* (2013.01); *B60W 2710/0666* (2013.01); *B60W 2710/083* (2013.01); *B60W 2710/305* (2013.01); *B60Y 2200/92* (2013.01); (Continued)

(58) Field of Classification Search
CPC ...... B60W 20/14; B60W 10/06; B60W 10/30; F01N 3/18
USPC .............................. 701/22, 103; 60/286, 301
See application file for complete search history.

(56) References Cited

U.S. PATENT DOCUMENTS

| | | | |
|---|---|---|---|
| 6,907,337 B2 * | 6/2005 | Phillips | B60K 6/44 701/51 |
| 2005/0060076 A1 * | 3/2005 | Phillips | B60K 6/44 701/51 |
| 2012/0303244 A1 * | 11/2012 | Wang | F02D 19/0652 701/103 |

FOREIGN PATENT DOCUMENTS

| | | |
|---|---|---|
| JP | 2004-285866 | 10/2004 |
| JP | 2006-132395 | 5/2006 |

(Continued)

*Primary Examiner* — Tan Q Nguyen
(74) *Attorney, Agent, or Firm* — Brinks Gilson & Lione (57) ABSTRACT

An apparatus for controlling a hybrid vehicle may include an engine that generates driving torque by combustion of fuel; an integrated starter-generator that starts the engine and generates electrical energy by selectively operating as a power generator; a drive motor that supports the power of the engine and generates electrical energy by selectively operating as a power generator; a battery that charges with the electrical energy generated by the integrated starter-generator and the drive motor; a nitrogen oxide purification device (LNT) that purifies nitrogen oxide included in exhaust gas exhausted from the engine; and a controller that controls engine torque by calculating a target engine torque for regenerating the nitrogen oxide purification device, supports the engine torque through the integrated starter-generator or the drive motor when a driving torque necessary for driving is greater than the target engine torque at a regeneration mode of the nitrogen oxide purification device, and performs regenerative braking the driving torque through the integrated starter-generator or the drive motor when the driving torque is less than the target engine torque.

12 Claims, 4 Drawing Sheets

(51) Int. Cl.
*B60W 20/14* (2016.01)
*B60W 10/08* (2006.01)
*B60W 10/30* (2006.01)

(52) U.S. Cl.
CPC ....... *B60Y 2300/47* (2013.01); *B60Y 2300/51* (2013.01); *B60Y 2300/52* (2013.01); *B60Y 2300/60* (2013.01); *B60Y 2300/91* (2013.01); *F01N 2390/02* (2013.01); *Y10S 903/93* (2013.01)

(56) References Cited

FOREIGN PATENT DOCUMENTS

| JP | 2008-280013 | 11/2008 |
| JP | 2009-035236 A | 2/2009 |
| KR | 10-2015-0076327 A | 7/2015 |

\* cited by examiner

APPARATUS AND METHOD FOR CONTROLLING HYBRID VEHICLE

CROSS-REFERENCE TO RELATED APPLICATION

This application claims priority to Korean Patent Application No. 10-2015-0122953 filed in the Korean Intellectual Property Office on Aug. 31, 2015, the entire contents of which is incorporated herein by reference.

BACKGROUND

1. Field Of The Invention

The present disclosure relates to an apparatus for controlling a hybrid vehicle and a method thereof. More particularly, the present disclosure relates to an apparatus and a method for controlling a hybrid vehicle that can improve fuel consumption of the vehicle and improve purification efficiency of exhaust gas when a LNT (lean NOx trap) that purifies nitrogen oxide included in exhaust gas is regenerated.

2. Description Of The Related Art

A hybrid vehicle may use two or more power sources, generally, such as an engine and a motor. At this time, a gasoline engine or a diesel engine can be used.

Hybrid vehicles can be manufactured in various structures using two or more power sources of an engine and a motor. The motor in a hybrid vehicle assists the power from the engine in accelerating or uphill driving.

In the hybrid vehicle mounted the diesel engine, since combustion is performed in a state where air excessive ratio is high because of a characteristic of a diesel engine, the exhaust amount of carbon monoxide (CO) or hydrocarbon is small in an exhaust gas unlike a gasoline engine, but nitrogen oxides (hereinafter, referred to as "NOx") and particulate matter (PM) are exhausted in a great amount.

In order to purify the NOx, a lean NOx trap (LNT) is used. The LNT absorbs nitrogen oxide included in the exhaust gas and causes the nitrogen oxide to react with a reducing agent under predetermined conditions.

The reduced nitrogen oxide is stored at the nitrogen oxide purification device as sulfur compound. The sulfur compound absorbed in the LNT deteriorates the nitrogen oxide purification performance and therefore the sulfur component has to be cyclically eliminated.

The elimination of the sulfur compound in the nitrogen oxide purification device may be called as 'regeneration'.

In order to perform regeneration of the nitrogen oxide purification device, the engine should be maintained constant regeneration condition. For example, an engine RPM should be within a predetermined rotation speed, and an engine torque should be within a predetermined torque. If the regeneration condition is not constantly maintained when the nitrogen oxide purification device is regenerated, regeneration efficiency is deteriorated, and number of regeneration and regeneration time are increased.

Further, when the nitrogen oxide purification device is regenerated, post injection is performed in order to exhaust gas is to be enrichment state. However, fuel injected by the post injection does not contribute to engine torque, therefore there is a problem that fuel consumption of vehicle is increased.

The above information disclosed in this Background section is only for enhancement of understanding of the background of the invention, and therefore, it may contain information that does not form prior art that is already known in this country to a person of ordinary skill in the art.

SUMMARY

The present disclosure has been made in an effort to provide an apparatus for controlling a hybrid vehicle that can improve regeneration efficiency and fuel consumption of a hybrid vehicle when a nitrogen oxide purification device is regenerated.

An apparatus for controlling a hybrid vehicle according to an exemplary form of the present disclosure may include an engine that generates driving torque by combustion of fuel; an integrated starter-generator that starts the engine and generates electrical energy by selectively operating as a power generator; a drive motor that supports the power of the engine and generates electrical energy by selectively operating as a power generator; a battery that charges with the electrical energy generated by the integrated starter-generator and the drive motor; a nitrogen oxide purification device (LNT) that purifies nitrogen oxide included in exhaust gas exhausted from the engine; and a controller that controls engine torque by calculating a target engine torque for regenerating the nitrogen oxide purification device, supports the engine torque through the integrated starter-generator or the drive motor when a driving torque necessary for driving is greater than the target engine torque at a regeneration mode of the nitrogen oxide purification device, and performs regenerative braking the driving torque through the integrated starter-generator or the drive motor when the driving torque is less than the target engine torque.

The controller may perform the control of the drive motor or the integrated starter-generator only when a SOC (state of charge) of the battery is within a predetermined range during the regeneration of the nitrogen oxide purification device.

When the driving torque is greater than the target engine torque, the controller may output an additional torque corresponding to a difference between the driving torque and the target engine torque so as to support the engine torque through the drive motor.

When the driving torque is less than the target engine torque and redundant torque corresponding to a difference between the driving torque and the target engine torque is less than a power generation amount of the integrated starter-generator, the controller may perform regenerative braking the redundant torque through the integrated starter-generator.

When the redundant torque is greater than the power generation amount of the integrated starter-generator, the controller may perform regenerative braking the redundant torque through the integrated starter-generator and the drive motor.

The controller may control the engine torque so that it is constantly maintained corresponding to the target engine torque during the regeneration of the nitrogen oxide purification device.

The controller may determine that the regeneration mode of the nitrogen oxide purification device is satisfied when a travel distance of the vehicle reaches a predetermined distance.

A method for controlling a hybrid vehicle according to another exemplary form of the present disclosure may include determining whether a regeneration mode of a nitrogen oxide purification device is satisfied; determining whether a SOC (State of charge) of a battery is within a predetermined range; comparing a target engine torque for regenerating the nitrogen oxide purification device to a driving torque necessary for driving when the regeneration mode of the nitrogen oxide purification device is satisfied and the SOC is within the predetermined range; and supporting the engine torque through an integrated starter-generator or a drive motor when the driving torque is greater than the target engine torque.

The method may further include when the driving torque is less than the target engine torque, comparing a redundant torque corresponding to a difference between the driving torque and the target engine torque to an amount of power generated from an integrated starter-generator; and regenerative braking the redundant torque through the integrated starter-generator when the redundant torque is less than the power generation amount of the integrated starter-generator.

The method may further include regenerative braking the redundant torque through the integrated starter-generator and the drive motor when the redundant torque is greater than the power generation amount of the integrated starter-generator.

The engine torque may be constantly maintained corresponding to the target engine torque during the regeneration of the nitrogen oxide purification device.

The regeneration mode of the nitrogen oxide purification device may be satisfied when a travel distance of the vehicle reaches a predetermined distance.

In exemplary forms of the present disclosure, since engine torque can be constantly maintained during regeneration of a nitrogen oxide purification device, regeneration efficiency of the nitrogen oxide purification device is improved.

Further, when an engine torque is greater than a required torque during regeneration of the nitrogen oxide purification device, the redundant torque is regenerative braked through the drive motor and/or the integrated starter-generator, and thus fuel consumption of the vehicle is decreased.

BRIEF DESCRIPTION OF THE DRAWINGS

The drawings are provided for reference in describing exemplary forms of the present disclosure, and the spirit of the present disclosure should not be construed only by the accompanying drawings.

DETAILED DESCRIPTION

The present disclosure will be described more fully hereinafter with reference to the accompanying drawings, in which exemplary forms of the disclosure are shown. As those skilled in the art would realize, the described forms may be modified in various different ways, all without departing from the spirit or scope of the present disclosure.

In describing forms of the present disclosure, parts that are not related to the description will be omitted. Like reference numerals generally designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity Hereinafter, an apparatus for controlling a hybrid vehicle according to an exemplary form of the present disclosure will be described in detail with reference to accompanying drawings.

Figure 1:
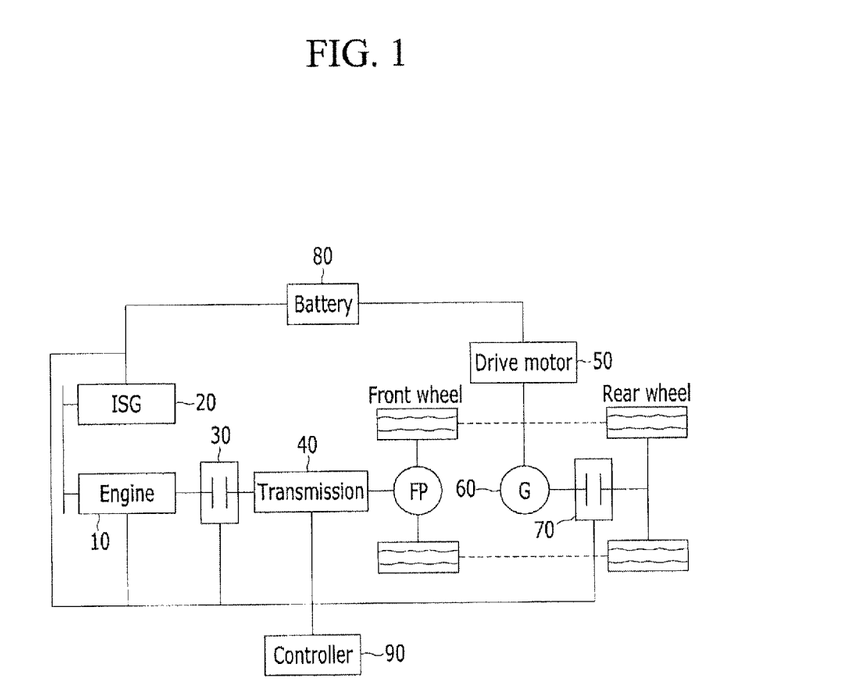
FIG. 1 is a schematic view illustrating an apparatus for controlling a hybrid vehicle.
Figure 2:
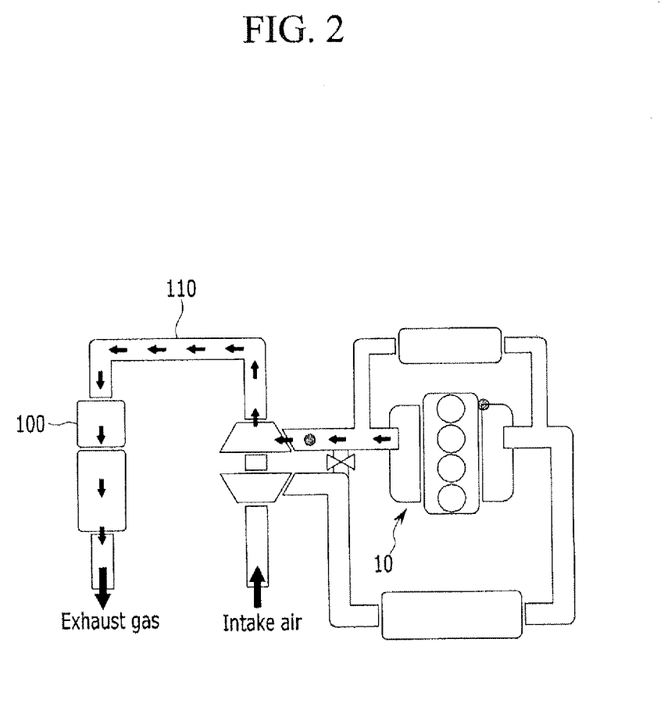
FIG. 2 is a schematic view illustrating an engine system.

FIG. 1 is a schematic view illustrating an apparatus for controlling a hybrid vehicle. FIG. 2 is a schematic view illustrating an engine system.

As shown in FIG. 1 and FIG. 2, an apparatus for controlling a hybrid vehicle includes an engine 10 that generates driving torque by combustion of fuel, an integrated starter-generator 20 that starts the engine 10 and generates electrical energy by selectively operating as a power generator, a drive motor 50 that supports the driving torque of the engine 10 and generates electrical energy by selectively operating as a power generator, a battery 80 that charges with the electrical energy generated by the integrated starter-generator 20 and the drive motor 50, a nitrogen oxide purification device 100 (LNT: lean NOx trap) that purifies nitrogen oxide included in exhaust gas exhausted from the engine 10, and a controller 90 that controls the engine 10, the integrated starter-generator 20, the drive motor 50, and the nitrogen oxide purification device 100.

The engine 10 generates driving torque by combustion of fuel and the driving torque is supplied to a front wheel of the vehicle.

An engine clutch 30 and a transmission 40 are sequentially disposed between the engine 10 and the front wheel. The engine clutch 30 is operated by the controller 90, the driving torque generated by the engine 10 is selectively supplied to the front wheel according to engagement or release of the engine clutch 30. The transmission 40 converts the driving torque of the engine 10 into a required torque according to a speed of the vehicle and transmits the driving torque to the front wheel.

The integrated starter-generator 20 operates as a starter and generator. That is, the integrated starter-generator 20 starts the engine 10 according to a signal supplied from the controller 90, and generates electrical energy by operating as a power generator with the engine 10 in operation. The electrical energy generated by the integrated starter-generator 20 is charged in battery 80. The integrated starter-generator 20 may be called as an ISG (integrated starter and generator) or HSG (hybrid starter and generator).

The drive motor 50 receives the electrical energy from the battery 80, generates driving torque and supplies the driving torque to a rear wheel of the vehicle for supporting power of the engine 10. For example, the drive motor 50 improves driving performance of the vehicle by supporting driving torque of the engine 10 when the vehicle is rapidly accelerated or travels up-hill road. The drive motor 50 generates electrical energy by operating as a generator when the vehicle is braked or coasted, the electrical energy is charged in the battery 80.

A decelerator 60 and a motor clutch 70 are disposed between the drive motor 50 and the rear wheel. The decelerator 60 converts the driving torque of the drive motor 50 to required torque and supplies to the rear wheel.

The motor clutch 70 is operated by the controller 90, and the driving torque of the drive motor 50 is supplied to the rear wheel according to an engagement and release of the motor clutch 70.

As described above, a hybrid vehicle where the engine torque is supplied to the front wheel and the drive motor torque is supplied to the rear wheel is called a TTR (through the road) type.

The TTR type of the hybrid vehicle will be exemplified in an exemplary form of the present disclosure. However, the present invention is not limited to the following exemplarily forms, and it may be applied to various types hybrid vehicle.

The controller 90 controls an operation of the engine 10, the engine clutch 30, the integrated starter-generator 20, the drive motor 50 and the motor clutch 70. The controller 90 may be implemented by one or more processors operated by a predetermined program, in which the predetermined program is set to perform steps of the method for controlling the hybrid vehicle.

The controller 90 may be implemented by an ECU (electronic control unit) and/or a HCU (hybrid control unit) provided in the vehicle.

Meanwhile, the nitrogen oxide purification device 100 that purifies nitrogen oxide is disposed at an exhaust pipe flowing exhaust gas exhausted from the engine 10. The nitrogen oxide purified by the nitrogen oxide purification device 100 is stored in the nitrogen oxide purification device 100 as sulfur compound.

The controller 90 controls the engine torque by calculating a target engine torque for regenerating the nitrogen oxide purification device 100. When the nitrogen oxide purification device 100 is regenerated, the engine torque should be constantly maintained.

If the engine torque cannot be constantly maintained by rapid acceleration or deceleration during the regeneration of the nitrogen oxide purification device 100, regeneration efficiency of the nitrogen oxide purification device 100 is deteriorated. Therefore, the regeneration of the nitrogen oxide purification device 100 is repetitively performed or regeneration time is increased, and thus purification efficiency of exhaust gas is deteriorated.

In order to address the above problems, the controller 90 controls the drive motor to support the engine torque through the drive motor 50 by comparing a driving torque necessary for driving the vehicle to the target engine torque during the regeneration mode of the nitrogen oxide purification device 100, when the driving torque is greater than the target engine torque.

When the driving torque is less than the target engine torque, the controller 90 performs regenerative braking redundant torque through the integrated starter-generator 20 or the drive motor 50. Further, the controller 90 may determine that the regeneration mode the nitrogen oxide purification device 100 is satisfied when a travel distance of the vehicle reaches a predetermined distance.

Here, the driving torque is determined by a required torque of a driver. For example, the required torque of the driver can be determined by an operation signal of an accelerator pedal or an operation signal of a brake pedal, the driving torque of the vehicle can be determined from the required torque.

Figure 3:
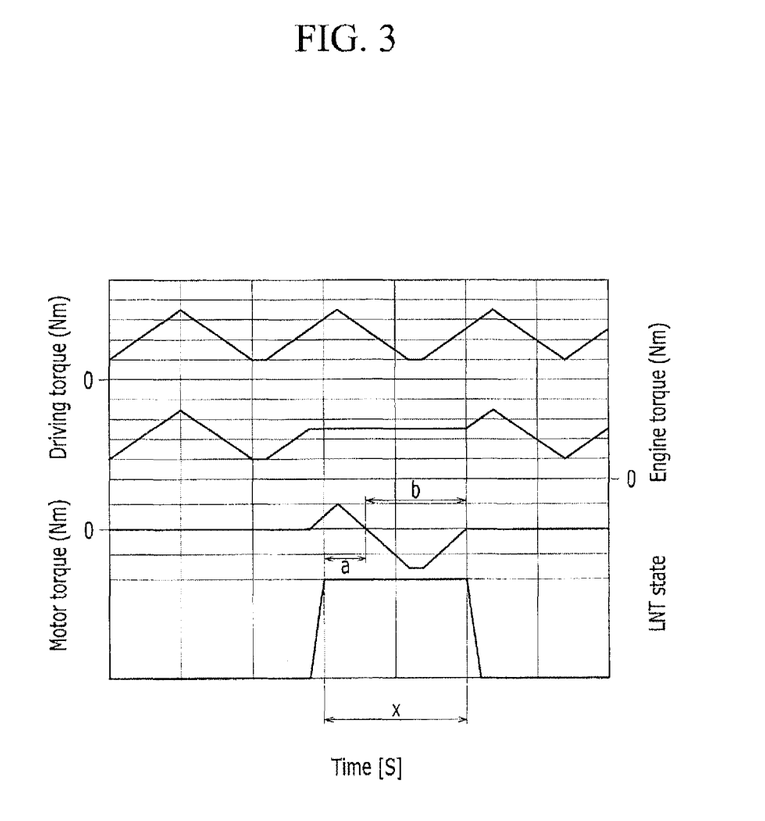
FIG. 3 is a graph illustrating a relationship among a torque of a drive motor, an engine torque, and a driving torque.

FIG. 3 is a graph illustrating a relationship among a torque of a drive motor, an engine torque, and a driving torque. In FIG. 3, 'x' section denotes regeneration section of the nitrogen oxide purification device 100, 'a' section denotes a section where the driving torque is greater than the engine torque, and 'b' section denotes a section where the driving torque is less than the engine torque. In FIG. 3, the motor torque includes torque of the drive motor and the integrated starter-generator. That the motor torque is greater than zero means that torque of the drive motor or the integrated starter-generator is output, and that the motor torque is less than zero means that regenerative brake is performed by the drive motor and/or the integrated starter-generator.

Referring to 'a' section of FIG. 3, when the driving torque is greater than the target engine torque, the controller 90 controls the engine 10 to output a torque corresponding the target engine torque through the engine 10, and controls the drive motor 50 to output an additional torque corresponding to a difference between the driving torque and the target engine torque through the drive motor 50.

Referring to 'b' section of FIG. 3, when the driving torque is less than the target engine torque, the controller 90 controls the integrated starter-generator 20 or the drive motor 50 to regenerative brake a redundant torque corresponding to a difference between the driving torque and the target engine torque through the integrated starter-generator 20 or the drive motor 50.

At this time, when the redundant torque is less than a power generation amount of the integrated starter-generator 20, the redundant torque is regenerative braked by the integrated starter-generator 20. When the redundant torque is greater than the power generation amount of the integrated starter-generator 20, the redundant torque is regenerative braked by the integrated starter-generator 20 and the drive motor 50.

Meanwhile, it is preferable that the control of the drive motor 50 or the integrated starter-generator 20 (torque output by the drive motor, and/or regenerative braking control by the integrated starter-generator/the drive motor) in the regeneration mode of the nitrogen oxide purification device 100 is performed only when the SOC (state of charge) of the battery 80 is within a predetermined range (for example, 40-80%).

If the additional torque is output through the drive motor 50 when the SOC of the battery 80 is less than the predetermined range, the battery 80 may be over-discharged. If the redundant torque is regenerative braked through the drive motor 50 or the integrated starter-generator 20 when the SOC the battery 80 is greater than the predetermined range, the battery 80 may be over-charged.

Hereinafter, a method for controlling the hybrid vehicle according to an exemplary form of the present disclosure will be described in detail with reference to accompanying drawings.

Figure 4:
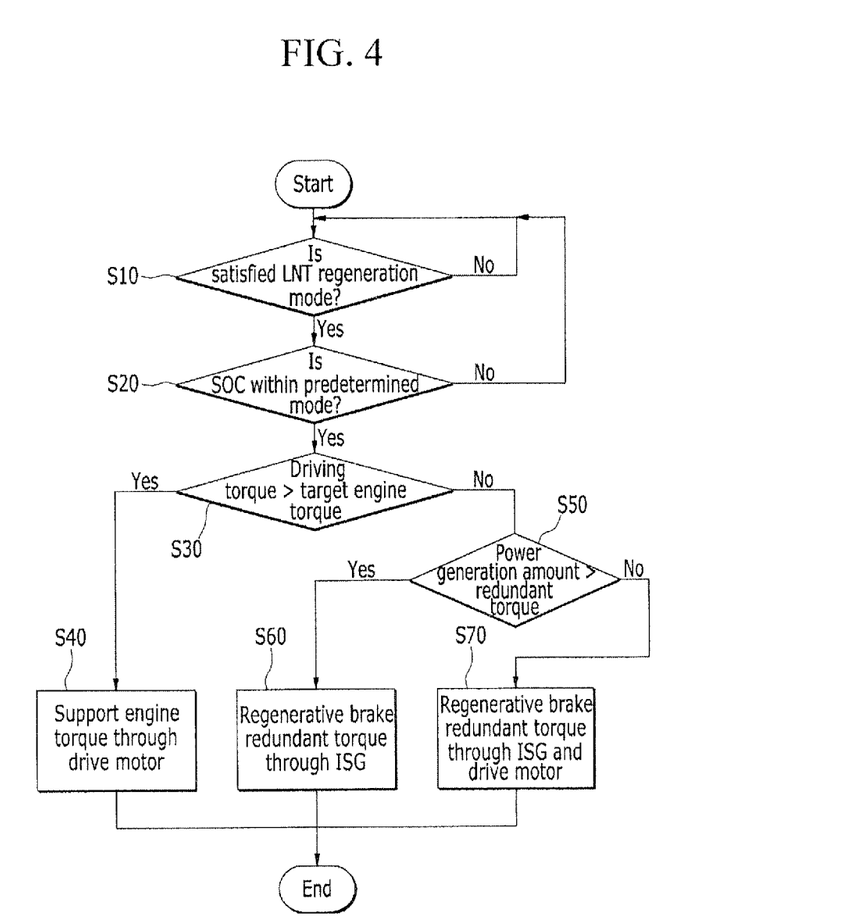
FIG. 4 is a flowchart illustrating a method for controlling a hybrid vehicle.

FIG. 4 is a flowchart illustrating a method for controlling a hybrid vehicle.

As shown in FIG. 4, the controller 90 determines whether the regeneration mode of the nitrogen oxide purification device 100 is satisfied at step S10. At this time, the controller 90 may determine the regeneration mode of the nitrogen oxide purification device 100 is satisfied when the travel distance of the vehicle reaches the predetermined distance.

When the regeneration mode of the nitrogen oxide purification device 100 is satisfied, the controller 90 whether the SOC of the battery 80 is within the predetermined range at step S20. That is, only when the regeneration mode is satisfied and the SOC is within the predetermined range, the control of the drive motor or the integrated starter-generator is performed by the controller 90. Detailed reasons are the same as description above.

When the SOC of the battery 80 is within the predetermined range, the controller 90 compares the target engine torque for regenerating the nitrogen oxide purification device 100 to the driving torque necessary for driving the vehicle at step S30.

When the driving torque is greater than the target engine torque, the controller 90 controls the drive motor 50 to support the engine torque by drive motor 50 at step S40.

In detail, when the driving torque is greater than the target engine torque, the controller 90 controls the engine 10 to output the target engine torque is output by the engine 10, and controls the drive motor 50 to output the additional torque corresponding to a difference between the driving torque and the target engine torque is output by the drive motor 50.

At the step S30, when the driving torque is less than the target engine torque, the controller 90 compares the redundant torque corresponding to the difference between the driving torque and the target engine torque to the power generation amount of the integrated starter-generator 20 at step S50.

When the redundant torque is less than the power generation amount of the integrated starter-generator 20, the controller 90 performs regenerative brake the redundant torque by the integrated starter-generator 20 at step S60.

When the redundant torque is greater than the power generation amount of the integrated starter-generator 20, the controller 90 performs regenerative brake the redundant torque by the integrated starter-generator 20 and the drive motor 50 at step S70.

As described above, since the controller 90 performs regenerative brake the redundant torque by the integrated starter-generator and the drive motor when the redundant torque is greater than the power generation amount of the integrated starter-generator 20, fuel consumption of the vehicle can be improved.

According to an exemplary form of the present disclosure, the additional torque is output by the drive motor 50 when the regeneration mode of the nitrogen oxide purification device 100 is satisfied and the driving torque is greater than the target engine torque. And the redundant torque is regenerative braked by the integrated starter-generator 20 and/or drive motor 50 when the driving torque is less than the target engine torque. Therefore, since the engine toque can be maintained to the target engine torque during the regeneration of the nitrogen oxide purification device, it is possible to improve regeneration efficiency of the nitrogen oxide purification device 100.

Further, since the redundant torque is regenerative braked by the integrated starter-generator 20 and/or drive motor 50 when the driving torque is less than the target engine torque, it is possible to improve fuel consumption of the vehicle.

While forms of the present disclosure have been described in connection with what is presently considered to be practical exemplary forms, it is to be understood that the disclosure is not limited to the disclosed forms, but, on the contrary, is intended to cover various modifications and equivalent arrangements included within the spirit and scope of the appended claims.

What is claimed is:

1. An apparatus for controlling a hybrid vehicle, comprising:
   an engine that is configured to generate driving torque by combustion of fuel;
   an integrated starter-generator that is configured to start the engine and to generate electrical energy by selectively operating as a power generator;
   a drive motor that is configured to support the power of the engine and to generate electrical energy by selectively operating as a power generator;
   a battery that is configured to charge with the electrical energy generated by the integrated starter-generator and the drive motor;
   a nitrogen oxide purification device (LNT) that is configured to purify nitrogen oxide included in exhaust gas that is exhausted from the engine; and
   a controller that is configured to control engine torque by calculating a target engine torque for regenerating the nitrogen oxide purification device, supporting the engine torque through the integrated starter-generator or the drive motor when a driving torque necessary for driving is greater than the target engine torque at a regeneration mode of the nitrogen oxide purification device, and performing regenerative braking with the driving torque through the integrated starter-generator or the drive motor when the driving torque is less than the target engine torque.

2. The apparatus of claim 1, wherein
   the controller is configured to perform the control of the drive motor or the integrated starter-generator only when a state of charge (SOC) of the battery is within a predetermined range during the regeneration of the nitrogen oxide purification device.

3. The apparatus of claim 2, wherein:
   when the driving torque is greater than the target engine torque, the controller is configured to output an additional torque corresponding to a difference between the driving torque and the target engine torque so as to support the engine torque through the drive motor.

4. The apparatus of claim 2, wherein
   when the driving torque is less than the target engine torque and the redundant torque corresponding to a difference between the driving torque and the target engine torque is less than a power generation amount of the integrated starter-generator, the controller is configured to perform regenerative braking with the redundant torque through the integrated starter-generator.

5. The apparatus of claim 4, wherein
   when the redundant torque is greater than the power generation amount of the integrated starter-generator, the controller is configured to perform regenerative braking with the redundant torque through the integrated starter-generator and the drive motor.

6. The apparatus of any one of claim 1, wherein
   the controller is configured to control the engine torque such that the engine torque is constantly maintained to correspond to the target engine torque during the regeneration of the nitrogen oxide purification device.

7. The apparatus of claim 1, wherein
   the controller is configured to determine that the regeneration mode of the nitrogen oxide purification device is satisfied when a travel distance of the vehicle reaches a predetermined distance.

8. A method for controlling a hybrid vehicle comprising:
   determining whether a regeneration mode of a nitrogen oxide purification device is satisfied;
   determining whether a state of charge (SOC) of a battery is within a predetermined range;
   comparing a target engine torque for regenerating the nitrogen oxide purification device to a driving torque necessary for driving when the regeneration mode of the nitrogen oxide purification device is satisfied and the SOC is within the predetermined range; and
   supporting the engine torque through an integrated starter-generator or a drive motor when the driving torque is greater than the target engine torque.

9. The method of claim 8, further comprising:
   when the driving torque is less than the target engine torque,
   comparing a redundant torque corresponding to a difference between the driving torque and the target engine torque to an amount of power generated by an integrated starter-generator; and regenerative braking the redundant torque through the integrated starter-generator when the redundant torque is less than the power generation amount of the integrated starter-generator.

10. The method of claim 9, further comprising:
regenerative braking the redundant torque through the integrated starter-generator and the drive motor when the redundant torque is greater than the power generation amount of the integrated starter-generator.

11. The method of any one of claim 8 to claim 10, wherein:
the engine torque is constantly maintained to correspond to the target engine torque during the regeneration of the nitrogen oxide purification device.

12. The method of claim 8, wherein:
the regeneration mode of the nitrogen oxide purification device is satisfied when a travel distance of the vehicle reaches a predetermined distance.

\* \* \* \* \*